(12) United States Patent
Wang et al.

(10) Patent No.: US 12,497,539 B2
(45) Date of Patent: Dec. 16, 2025

(54) SILICONE COATINGS FOR AIR BAGS

(71) Applicant: DOW SILICONES CORPORATION, Midland, MI (US)

(72) Inventors: Rui Wang, Shanghai (CN); Shaohui Wang, Shanghai (CN); Yusheng Chen, Shanghai (CN)

(73) Assignee: DOW SILICONES CORPORATION, Midland, MI (US)

( * ) Notice: Subject to any disclaimer, the term of this patent is extended or adjusted under 35 U.S.C. 154(b) by 940 days.

(21) Appl. No.: 17/631,014

(22) PCT Filed: Jul. 30, 2019

(86) PCT No.: PCT/CN2019/098273
§ 371 (c)(1),
(2) Date: Jan. 28, 2022

(87) PCT Pub. No.: WO2021/016833
PCT Pub. Date: Feb. 4, 2021

(65) Prior Publication Data
US 2022/0356370 A1    Nov. 10, 2022

(51) Int. Cl.
| C09D 183/10 | (2006.01) |
| C08K 3/36 | (2006.01) |
| C08K 5/56 | (2006.01) |
| C09D 7/61 | (2018.01) |
| C09D 7/63 | (2018.01) |
| D06M 15/643 | (2006.01) |

(52) U.S. Cl.
CPC .............. *C09D 183/10* (2013.01); *C08K 3/36* (2013.01); *C08K 5/56* (2013.01); *C09D 7/61* (2018.01); *C09D 7/63* (2018.01); *D06M 15/643* (2013.01)

(58) Field of Classification Search
CPC .......... C09D 183/10; C09D 7/61; C09D 7/63; C09D 183/04; C08K 3/36; C08K 5/56; C08K 3/26; C08K 3/34; C08K 5/5415; C08K 5/5435; D06M 15/643; B60R 21/235; B60R 2021/23514; C08G 77/045; C08G 77/12; C08G 77/16; C08G 77/18; C08G 77/20; C08G 77/14; C08G 77/70; C08L 83/04
See application file for complete search history.

(56) References Cited

U.S. PATENT DOCUMENTS

| 6,250,674 | B1 | 6/2001 | Kreuzer et al. |
| 8,058,190 | B2 | 11/2011 | Sweet et al. |
| 8,168,276 | B2 | 5/2012 | Cleaver et al. |
| 8,475,701 | B2 | 7/2013 | Nozoe |
| 8,962,498 | B2 | 2/2015 | Yamamoto et al. |
| 9,062,411 | B2 | 6/2015 | Nozoe et al. |
| 10,095,079 | B2 | 10/2018 | Choi et al. |
| 11,332,855 | B2 | 5/2022 | Nozoe |
| 2007/0281564 | A1 | 12/2007 | Mizushima et al. |
| 2009/0001690 | A1* | 1/2009 | Ikeno ................... C09D 183/04 524/492 |
| 2009/0033076 | A1 | 2/2009 | Ikeno et al. |
| 2010/0190396 | A1 | 7/2010 | Nozoe et al. |
| 2011/0064882 | A1 | 3/2011 | Mizushima et al. |
| 2012/0288649 | A1 | 11/2012 | Blackwood et al. |
| 2012/0289110 | A1 | 11/2012 | Blackwood et al. |
| 2013/0071591 | A1* | 3/2013 | Yamamoto ........... C09D 183/04 428/36.1 |
| 2013/0099468 | A1 | 4/2013 | Mizushima et al. |
| 2015/0266264 | A1 | 9/2015 | Lowe et al. |
| 2015/0267344 | A1 | 9/2015 | Blackwood et al. |
| 2016/0152206 | A1 | 6/2016 | Tosa |
| 2019/0092969 | A1 | 3/2019 | Akitomo et al. |
| 2020/0070764 | A1 | 3/2020 | Ashida et al. |

FOREIGN PATENT DOCUMENTS

| CN | 101163747 A | 4/2008 |
| CN | 1890426 B | 9/2012 |
| CN | 102686686 A | 9/2012 |
| CN | 102844379 A | 12/2012 |
| CN | 103131327 A | 6/2016 |
| JP | 2008013752 A | 1/2008 |
| JP | 2009143383 A | 7/2009 |
| JP | 2018172103 A | 11/2018 |
| WO | 2011162900 A1 | 12/2011 |
| WO | 2021016833 A1 | 2/2021 |
| WO | 2021016834 A1 | 2/2021 |

OTHER PUBLICATIONS

International Search Report for PCT/CN2019/098273 dated Apr. 22, 2020, 3 pages.
International Search Report for PCT/CN2019/098274 dated Apr. 23, 2020, 2 pages.
Machine assisted English translation of CN1890426 obtained from https://patents.google.com/patent on Apr. 7, 2022, 20 pages.
Machine assisted English translation of CN101163747 obtained from https://patents.google.com/patent on Apr. 7, 2022, 13 pages.

(Continued)

*Primary Examiner* — Michael B Nelson
(74) *Attorney, Agent, or Firm* — Warner Norcross + Judd LLP

(57) ABSTRACT

A hydrosilylation curable textile coating composition comprises: (a) a linear organopolysiloxane polymer having at least two alkenyl and/or alkynyl groups per molecule; (b) a reinforcing filler comprising at least one of fumed silica, precipitated silica, or calcium carbonate; (c) a linear trimethyl terminated polydimethyl methylhydrogen siloxane containing at least two silicon-bonded hydrogen groups per molecule; (d) a hydrosilylation cure catalyst; (e) an organosilicon resin; and (f) an adhesion promoter comprising a mixture and/or reaction product of: (i) one or more alkoxysilanes having an epoxy group in the molecule; (ii) a linear organopolysiloxane oligomer containing at least one alkenyl group and at least one hydroxy or alkoxy group per molecule; and (iii) an organometallic condensation reaction catalyst comprising organoaluminum or organozirconium compounds. Air bags and air bag fabrics can be coated with the hydrosilylation curable textile coating composition, and the resulting air bags and fabrics generally have enhanced scrub resistance.

13 Claims, No Drawings

(56) References Cited

OTHER PUBLICATIONS

Machine assisted English translation of JP2018172103A obtained from htttps://worldwide.espacenet.com on May 26, 2022, 12 pages.
Machine assisted English translation of JP2009143383A obtained from https://patents.google.com/patent on May 26, 2022, 4 pages.
Machine assisted English translation of JP2008013752A obtained from <https://patents.google.com/patent> on Sep. 24, 2024, 10 pages.

\* cited by examiner

SILICONE COATINGS FOR AIR BAGS

CROSS-REFERENCE TO RELATED APPLICATIONS

This application is the U.S. National Stage of, and claims priority to and all advantages of, International Application No. PCT/CN2019/098273 filed on 30 Jul. 2019, the content of which is incorporated herein by reference.

This disclosure relates to hydrosilylation curable silicone compositions designed to be coated on textiles, in particular airbags and/or airbag fabrics, airbags and/or air bag fabrics coated with a cured product of hydrosilylation curable silicone rubber compositions and to a process for coating air bags and air bag fabrics with the hydrosilylation curable silicone rubber compositions. The composition has been designed such that coated fabrics made by applying and curing the composition have enhanced scrub resistance.

An airbag generally consists of a textile bag (sometimes referred to as a cushion), a sensor and a means of inflation. When the sensor detects a collision, the inflator causes an effectively immediate inflation of the airbag, typically by the release of gases. The Air bags and/or airbag fabrics may be made from a woven or knitted fabric made of synthetic fibre, for example of polyamide such as nylon-6,6 or polyester. They may be made from flat fabric pieces which are coated and then sewn together to provide sufficient mechanical strength or may be woven in one piece with integrally woven seams. Sewn air bags are generally assembled with the coated fabric surface at the inside of the air bag. One-piece woven air bags are coated on the outside of the air bag.

Today, airbags are standard accessories in most modern vehicles and many of them are coated with a silicone coating which is designed to keep the airbags flexible and resistant to temperature fluctuations, aging and abrasion. They need such properties because for example an airbag may remain unused for a long period of time before a collision triggers deployment. This requires the silicone coating to be very stable over time in order to prevent the airbag from becoming stuck and to ensure smooth deployment even after many years. Furthermore, they need good thermal stability given the inflator is usually designed to release extremely hot gases during inflation which could otherwise cause burns to the passenger and prevents or at least significantly reduces the likelihood of the fabric onto which the coating is coated from burning through to the passenger.

Hence, scrub resistance is a very important property for silicone based coatings on textiles but particularly with respect to airbags and airbag fabrics. This is because scrub resistance reflects the adhesion stability of a silicone coating to fabrics. Poor scrub resistance, can lead to delamination or falling off of the coating from the fabric after a period of time rendering the silicone coating having poor adhesion to fabrics and potentially leading to failure of an airbag to expand when triggered due to a crash or other incident.

Today in an increasingly safety conscious environment, vehicle manufacturers provide vehicles with an assortment of airbags to improve the protection of vehicle passengers, protection of occupants. These may include, but are not restricted to frontal airbags, side airbags, thorax airbags, Side curtain airbags and/or knee airbags.

There is therefore a constant need to improve the physical properties of the elastomeric cured products of such compositions to improve the safety and function of the airbags for example airbags with improved scrub resistance will increase the ability thereof to maintain the integrity of the airbag during the sudden expansion triggered by a collision.

There is provided herein a hydrosilylation curable textile coating composition comprising:
a) a linear organopolysiloxane polymer having at least two alkenyl and/or alkynyl groups per molecule;
b) reinforcing fillers comprising fumed silica, precipitated silica and/or calcium carbonate;
c) a linear trimethyl terminated polydimethyl methylhydrogen siloxane containing at least two, alternatively at least three silicon-hydrogen groups per molecule; wherein the molar ratio of silicon bonded hydrogen groups to alkenyl groups and alkynyl groups in the composition is from 1:1 to 5:1;
d) a hydrosilylation cure catalyst;
e) organosilicon resin containing M and Q units, where a proportion of the M units may be $M^{vi}$ units per molecule;
f) an adhesion promoter comprising a mixture and/or reaction product of
  i) one or more alkoxysilanes having an epoxy group in the molecule;
  ii) a linear organopolysiloxane oligomer containing at least one alkenyl group and at least one hydroxy or alkoxy group per molecule; and
  iii) an organometallic condensation reaction catalyst comprising organoaluminum or organozirconium compounds.

There is also provided a textile coated with the cured product of the above composition. In one embodiment the textile is an airbag fabric and/or an airbag.

There is also provided a method of coating a textile with a hydrosilylation curable textile coating composition comprising:
a) a linear organopolysiloxane polymer having at least two alkenyl and/or alkynyl groups per molecule;
b) reinforcing fillers comprising fumed silica, precipitated silica and/or calcium carbonate;
c) a linear trimethyl terminated polydimethyl methylhydrogen siloxane containing at least two, alternatively at least three silicon-hydrogen groups per molecule; wherein the molar ratio of silicon bonded hydrogen groups to alkenyl groups and alkynyl groups in the composition is from 1:1 to 5:1;
d) a hydrosilylation cure catalyst;
e) organosilicon resin containing M and Q units, where a proportion of the M units may be $M^{vi}$ units per molecule;
f) an adhesion promoter comprising a mixture and/or reaction product of
  i) one or more alkoxysilanes having an epoxy group in the molecule;
  ii) a linear organopolysiloxane oligomer containing at least one alkenyl group and at least one hydroxy or alkoxy group per molecule; and
  iii) an organometallic condensation reaction catalyst comprising organoaluminum or organozirconium compounds;
by mixing the composition together, coating a textile with the composition and curing the composition on the textile.

There is also provided the use of a composition as hereinbefore described to provide a coated textile with an improved scrub resistance.

Component (a) of the hydrosilylation curable textile coating composition is one or more polydiorganosiloxane polymer(s) having a viscosity of from 1000 to 500,000 mPa·s at 25° C. containing at least one alkenyl and/or at least one alkynyl group per molecule, alternatively at least two alkenyl and/or alkynyl groups per molecule, alternatively at least two alkenyl and/or alkynyl groups per molecule. Polydiorganosiloxane polymer (a) has multiple units of the formula (I):

$$R_aSiO_{(4-a)/2} \quad (I)$$

in which each R is independently selected from an aliphatic hydrocarbyl, aromatic hydrocarbyl, or organyl group (that is any organic substituent group, regardless of functional type, having one free valence at a carbon atom). Saturated aliphatic hydrocarbyls are exemplified by, but not limited to alkyl groups such as methyl, ethyl, propyl, pentyl, octyl, undecyl, and octadecyl and cycloalkyl groups such as cyclohexyl. Unsaturated aliphatic hydrocarbyls are exemplified by, but not limited to, alkenyl groups such as vinyl, allyl, butenyl, pentenyl, cyclohexenyl and hexenyl; and by alkynyl groups. Aromatic hydrocarbon groups are exemplified by, but not limited to, phenyl, tolyl, xylyl, benzyl, styryl, and 2-phenylethyl. Organyl groups are exemplified by, but not limited to, halogenated alkyl groups such as chloromethyl and 3-chloropropyl; nitrogen containing groups such as amino groups, amido groups, imino groups, imido groups; oxygen containing groups such as polyoxyalkylene groups, carbonyl groups, alkoxy groups and hydroxyl groups. Further organyl groups may include sulfur containing groups, phosphorus containing groups and/or boron containing groups. The subscript "a" may be 0, 1, 2 or 3, but is typically mainly 2 or 3.

Examples of typical groups on the polydiorganosiloxane polymer (a) include mainly alkenyl, alkyl, and/or aryl groups. The groups may be in pendent position (on a D or T siloxy unit) or may be terminal (on an M siloxy unit). Hence, suitable alkenyl groups in polydiorganosiloxane polymer (a) typically contain from 2 to 10 carbon atoms, e.g., vinyl, isopropenyl, allyl, and 5-hexenyl.

The silicon-bonded organic groups attached to polydiorganosiloxane polymer (a) other than alkenyl groups and/or alkynyl groups are typically selected from monovalent saturated hydrocarbon groups, which typically contain from 1 to 10 carbon atoms, and monovalent aromatic hydrocarbon groups, which typically contain from 6 to 12 carbon atoms, which are unsubstituted or substituted with groups that do not interfere with curing of this hydrosilylation curable textile coating composition, such as halogen atoms. Preferred species of the silicon-bonded organic groups are, for example, alkyl groups such as methyl, ethyl, and propyl; and aryl groups such as phenyl.

The molecular structure of polydiorganosiloxane polymer (a) is typically linear, however, there can be some branching due to the presence of T units (as previously described) within the molecule.

The viscosity of polydiorganosiloxane polymer (a) should be between 100 and 1000,000 mPa·s at 25° C., alternatively between 1000 and 150,000 mPa·s at 25° C., alternatively, from 1000 mPa·s to 125,000 mPa·s, alternatively from 1000 mPa·s to 100,000 mPa·s at 25° C. alternatively from 1000 mPa·s to 75,000 mPa·s at 25° C. measured in accordance with ASTM D1084 using a Brookfield rotational viscometer with the most appropriate spindle for the viscosity being measured at 1 rpm, unless otherwise indicated.

The polydiorganosiloxane polymer (a) may be selected from polydimethylsiloxanes, alkylmethylpolysiloxanes, alkylarylpolysiloxanes or copolymers thereof containing e.g., alkenyl and/or alkynyl groups and may have any suitable terminal groups, for example, they may be trialkyl terminated, alkenyldialkyl terminated or may be terminated with any other suitable terminal group combination providing each polymer contains at least two alkenyl groups per molecule. Alternatively, polydiorganosiloxane may be partially fluorinated, e.g., it may comprise trifluoroalkyl, e.g., trifluoropropyl groups and or perfluoroalkyl groups. Hence the Polydiorganosiloxane polymer (a) may be, for the sake of example, dimethylvinyl terminated polydimethylsiloxane, dimethylvinylsiloxy-terminated dimethylmethylphenylsiloxane, trialkyl terminated dimethylmethylvinyl polysiloxane or dialkylvinyl terminated dimethylmethylvinyl polysiloxane copolymers.

For example, a polydiorganosiloxane polymer (a) containing alkenyl groups at the two terminals may be represented by the general formula (II):

$$R'R''R'''SiO-(R''R'''SiO)_m-SiOR'''R''R' \quad (II)$$

In formula (II), each R' may be an alkenyl group or an alkynyl group, which typically contains from 2 to 10 carbon atoms. Alkenyl groups include but are not limited to vinyl, propenyl, butenyl, pentenyl, hexenyl an alkenylated cyclohexyl group, heptenyl, octenyl, nonenyl, decenyl or similar linear and branched alkenyl groups and alkenylated aromatic ringed structures. Alkynyl groups may be selected from but are not limited to ethynyl, propynyl, butynyl, pentynyl, hexynyl an alkynylated cyclohexyl group, heptynyl, octynyl, nonynyl, decynyl or similar linear and branched alkenyl groups and alkenylated aromatic ringed structures.

R'' does not contain ethylenic unsaturation, Each R'' may be the same or different and is individually selected from monovalent saturated hydrocarbon group, which typically contain from 1 to 10 carbon atoms, and monovalent aromatic hydrocarbon group, which typically contain from 6 to 12 carbon atoms. R'' may be unsubstituted or substituted with one or more groups that do not interfere with curing of this hydrosilylation curable textile coating composition, such as halogen atoms. R''' is R' or R''.

The one or more polydiorganosiloxane polymer(s) (a) having a viscosity of from 1000 to 500,000 mPa·s at 25° C. containing two or more alkenyl groups or alkynyl groups per molecule is present in an amount of from 10 to 90 wt. wt. %. % of the of the composition; alternatively, from 40 to 80 wt. % of the of the composition, alternatively from 50 to 75 wt. of the composition.

Component (b) of the hydrosilylation curable textile coating composition is a reinforcing filler such as fumed silica, precipitated silica and/or calcium carbonate. Finely divided forms of silica are preferred reinforcing fillers (b) e.g., silica fillers having a relatively high surface area, which is typically at least 50 m²/g (BET method in accordance with ISO 9277: 2010). For example, fillers, (e.g., fumed silica) having surface areas of from 50-450 m²/g, alternatively, 50-400 450 m²/g m²/g, alternatively from 50 to 300 m²/g, alternatively 200-300 m²/g (BET method in accordance with ISO 9277: 2010) are typically used.

When reinforcing filler (b) is naturally hydrophilic (e.g., untreated silica fillers), it is typically treated with a treating agent to render it hydrophobic. These surface modified reinforcing fillers (b) do not clump and can be homogeneously incorporated into polydiorganosiloxane polymer (a), described below, as the surface treatment makes the fillers easily wetted by polydiorganosiloxane polymer (a).

Typically reinforcing filler (b) may be surface treated with any low molecular weight organosilicon compounds disclosed in the art applicable to prevent creping of organosiloxane compositions during processing. For example, organosilanes, polydiorganosiloxanes, or organosilazanes e.g., hexaalkyl disilazane, short chain siloxane diols, organosilicon cyclics or fatty acids or fatty acid esters such as stearates to render the filler(s) hydrophobic and therefore easier to handle and obtain a homogeneous mixture with the other ingredients. Specific examples include but are not restricted to silanol terminated trifluoropropylmethyl siloxane, silanol terminated ViMe siloxane, tetramethyldi (trifluoropropyl)disilazane, tetramethyldivinyl disilazane, hexamethyl disilazane, silanol terminated MePh siloxane, liquid hydroxyl-terminated polydiorganosiloxane containing an average from 2 to 20 repeating units of diorganosiloxane in each molecule, hexaorganodisiloxane, hexaorganodisilazane. A small amount of water can be added together with the silica treating agent(s) as a processing aid.

The surface treatment may be undertaken prior to introduction in the hydrosilylation curable textile coating composition or in situ (i.e., in the presence of at least a portion of the other ingredients of the hydrosilylation curable textile coating composition herein by blending these ingredients together at room temperature or above until the filler is completely treated. Typically, untreated reinforcing filler (b) is treated in situ with a treating agent in the presence of polydiorganosiloxane polymer (a) which results in the preparation of a silicone rubber base material which can subsequently be mixed with other ingredients.

Reinforcing filler is present in an amount of from 1.0 to 50 wt. %. of the composition, alternatively of from 1 to 30 wt. %. of the composition, alternatively of from 5.0 to 25 wt. %. based on the weight % of the composition.

Organohydrogenpolysiloxane (c) of the hydrosilylation curable textile coating composition is a linear trimethyl terminated polydimethyl methylhydrogen siloxane containing at least two, alternatively at least three silicon-hydrogen groups per molecule, which functions as a cross-linker for curing polymer (i) by addition/hydrosilylation reaction of the silicon-bonded hydrogen atoms in component (c) with the alkenyl groups in polymer (a) catalysed by component (d) described below. Organohydrogenpolysiloxane (c) normally contains 3 or more silicon-bonded hydrogen atoms so that the hydrogen atoms can react with the unsaturated alkenyl or alkynyl groups of polymer (a) to form a network structure therewith and thereby cure the composition. Some or all of organohydrogenpolysiloxane (c) may alternatively have 2 silicon bonded hydrogen atoms per molecule when polymer (a) has >2 alkenyl or alkynyl groups per molecule.

Organohydrogenpolysiloxane (c) is a linear trimethyl terminated polydimethyl methylhydrogen siloxane containing at least two, alternatively at least three silicon-hydrogen groups per molecule. While the molecular weight/viscosity of organohydrogenpolysiloxane (c) is not specifically restricted, the viscosity is typically from 1 to 50,000 mPa·s at 25° C. using a glass capillary viscometer, in order to obtain a good miscibility with polymer (a).

Organohydrogenpolysiloxane (c) of the hydrosilylation curable textile coating composition is typically added in an amount such that the molar ratio of the total number of the silicon-bonded hydrogen atoms in organohydrogenpolysiloxane (c) to the total number of alkenyl and/or alkynyl groups in polymer (a) is from 0.5:1 to 20:1. When this ratio is less than 0.5:1, a well-cured composition will not be obtained. When the ratio exceeds 20:1, there is a tendency for the hardness of the cured composition to increase when heated. Preferably, the composition has a molar ratio of silicon bonded hydrogen groups to alkenyl groups and alkynyl groups in the composition of from 1:1 to 5:1, alternatively from 1:1 to 3:1.

The silicon-bonded hydrogen (Si—H) content of organohydrogenpolysiloxane (c) of the hydrosilylation curable textile coating composition is determined using quantitative infra-red analysis in accordance with ASTM E168. In the present instance the silicon-bonded hydrogen to alkenyl (vinyl) and/or alkynyl ratio is important when relying on a hydrosilylation cure process. Generally, this is determined by calculating the total weight % of alkenyl groups in the composition, e.g., vinyl [V] and the total weight % of silicon bonded hydrogen [H] in the composition and given the molecular weight of hydrogen is 1 and of vinyl is 27 the molar ratio of silicon bonded hydrogen to vinyl is 27[H]/[V]. In the composition organohydrogenpolysiloxane (c) is present in an amount of from 1 to 40% wt., alternatively, 1 to 30% wt., alternatively 1 to 20% wt. of the composition.

(d) Hydrosilylation Catalyst

When present hydrosilylation catalyst (d) of the hydrosilylation curable textile coating composition used for application onto the primer treated silicone elastomer substrate is preferably one of the platinum metals (platinum, ruthenium, osmium, rhodium, iridium and palladium), or a compound of one or more of such metals. Platinum and platinum compounds are preferred due to the high activity level of these catalysts in hydrosilylation reactions.

Examples of preferred hydrosilylation catalysts (d) include but are not limited to platinum black, platinum on various solid supports, chloroplatinic acids, alcohol solutions of chloroplatinic acid, and complexes of chloroplatinic acid with ethylenically unsaturated compounds such as olefins and organosiloxanes containing ethylenically unsaturated silicon-bonded hydrocarbon groups. The catalyst (d) can be platinum metal, platinum metal deposited on a carrier, such as silica gel or powdered charcoal, or a compound or complex of a platinum group metal.

Examples of suitable platinum-based catalysts include
(i) complexes of chloroplatinic acid with organosiloxanes containing ethylenically unsaturated hydrocarbon groups are described in U.S. Pat. No. 3,419,593;
(ii) chloroplatinic acid, either in hexahydrate form or anhydrous form;
(iii) a platinum-containing catalyst which is obtained by a method comprising reacting chloroplatinic acid with an aliphatically unsaturated organosilicon compound, such as divinyltetramethyldisiloxane;
(d) alkene-platinum-silyl complexes as described in U.S. Pat. No. 6,605,734 such as (COD)Pt(SiMeCl$_2$)$_2$ where "COD" is 1,5-cyclooctadiene; and/or
(v) Karstedt's catalyst, a platinum divinyl tetramethyl disiloxane complex typically containing about 1 wt. % of platinum in a solvent, such as toluene may be used. These are described in U.S. Pat. Nos. 3,715,334 and 3,814,730.

The hydrosilylation catalyst (d) of the hydrosilylation curable textile coating composition is present in the total composition in a catalytic amount, i.e., an amount or quantity sufficient to catalyse the addition/hydrosilylation reaction and cure the composition to an elastomeric material under the desired conditions. Varying levels of the hydrosilylation catalyst (d) can be used to tailor reaction rate and cure kinetics. The catalytic amount of the hydrosilylation catalyst (d) is generally between 0.01 ppm, and 10,000 parts by weight of platinum-group metal, per million parts (ppm), based on the combined weight of the composition polymer (a) and filler (b); alternatively, between 0.01 and 5000 ppm; alternatively, between 0.01 and 3,000 ppm, and alternatively between 0.01 and 1,000 ppm. In specific embodiments, the catalytic amount of the catalyst may range from 0.01 to 1,000 ppm, alternatively 0.01 to 750 ppm, alternatively 0.01 to 500 ppm and alternatively 0.01 to 100 ppm of metal based on the weight of the composition. The ranges may relate solely to the metal content within the catalyst or to the catalyst altogether (including its ligands) as specified, but typically these ranges relate solely to the metal content within the catalyst. The catalyst may be added as a single species or as a mixture of two or more different species. Typically, dependent on the form/concentration in which the catalyst package is provided the amount of catalyst present will be within the range of from 0.001 to 3.0 wt. % of the composition.

The hydrosilylation curable textile coating composition also comprises component (e) an organosilicon resin containing M and Q units and optionally $M^{vi}$ units, based on the nomenclature discussed previously. Any suitable MQ resin may be utilised as component e) Typically, the MQ resins of component (e) comprise $SiO_{4/2}$ (Q) siloxane units and $R^2_3 SiO_{1/2}$ (M) siloxane units wherein each $R^2$ may be the same or different and denotes a monovalent group selected from hydrocarbon groups, preferably having less than 20 carbon atoms and, most preferably, having from 1 to 10 carbon atoms. Examples of suitable $R^2$ groups include alkyl groups, such as methyl, ethyl, propyl, pentyl, octyl, undecyl and octadecyl; cycloaliphatic groups, such as cyclohexyl; aryl groups such as phenyl, tolyl, xylyl, benzyl, alpha-methyl styryl and 2-phenylethyl. Examples of preferred unreactive $R^2_3 SiO_{1/2}$ (M) siloxane units include $Me_3 SiO_{1/2}$, $PhMe_2 SiO_{1/2}$ and $Ph_2 MeSiO_{1/2}$, where Me hereinafter denotes methyl and Ph hereinafter denotes phenyl. Optionally the M type siloxane units may contain alkenyl groups in which case they are denoted as $M^{vi}$ groups. Usually the alkenyl group is a vinyl group, but other alkenyl groups may alternatively be present. Examples of $M^{vi}$ groups include but are not limited to $ViMe_2 SiO_{1/2}$, $ViPh_2 SiO_{1/2}$, $Vi_2MeSiO_{1/2}$, $Vi_2PhSiO_{1/2}$ groups. The molar ratio of $M+M^{vi}$ siloxane units to $SiO_{4/2}$ siloxane units has a value of from 0.5:1 to 1.2:1, alternatively 0.6:1 to 1.1:1.

In one embodiment MQ resin (e) includes a resinous portion wherein the M and/or $M^{vi}$ units are bonded to $SiO_{4/2}$ siloxane units (i.e., Q units) and each of Q units is bonded to at least one other $SiO_{4/2}$ siloxane unit. The molar ratio of M units to Q units is from 0.5:1 to 1.2:1, alternatively 0.6:1 to 1.1:1, and the resin contains an average of from 1.5 to 7.5 weight % of alkenyl groups and/or alkynyl groups, alternatively alkenyl groups, alternatively from about 2 to 5 weight % of alkenyl groups and/or alkynyl groups, alternatively alkenyl groups The alkenyl and/or alkynyl content is determined using quantitative infra-red analysis in accordance with ASTM E168. The MQ resin (e) may have a number-average molecular weight of from 2000 to 50,000 g/mol, alternatively from 3,000 to 30,000 g/mol. Synthetic polymers and resins invariably consist of a mixture of macromolecular species with different degrees of polymerization and therefore of different molecular weights. There are different types of average polymer molecular weight, which can be measured in different experiments.

The two most important are the number average molecular weight (Mn) and the weight average molecular weight (Mw). The Mn and Mw of a silicone polymer and/or resin can be determined by Gel permeation chromatography (GPC) with precision of about 10-15%. This technique is standard and yields Mw, Mn and polydispersity index (PI). The degree of polymerisation (DP)=Mn/Mu where Mn is the number-average molecular weight coming from the GPC measurement and Mu is the molecular weight of a monomer unit. PI=Mw/Mn. The DP is linked to the viscosity of the polymer via Mw, the higher the DP, the higher the viscosity. The MQ resin (e) may be present in the composition in an amount of from 1-60% wt., alternatively 1-40% wt., and is preferably in the form of either an MQ or an $MM^{vi}Q$ resin.

The hydrosilylation curable textile coating composition herein also comprises an adhesion promoter (f) comprising a mixture and/or reaction product of:
i) one or more alkoxysilanes having an epoxy group in the molecule;
(ii) a linear organopolysiloxane oligomer containing at least one alkenyl group and at least one hydroxy or alkoxy group per molecule; and
(iii) an organometallic condensation reaction catalyst comprising organoaluminum or organozirconium compounds.

The first component of the adhesion promoter (f) (i) is an epoxy-containing alkoxysilane. Examples of epoxy-containing alkoxysilanes may include 3-glycidoxypropyl trimethoxysilane, 3-glycidoxypropyl triethoxysilane, 3-glycidoxypropyl methyldimethoxysilane, 4-glycidoxybutyl trimethoxysilane, 5,6-epoxyhexyl triethoxysilane, 2-(3,4-epoxycyclohexyl) ethyltrimethoxysilane, or 2-(3,4-epoxycyclohexyl) ethyltriethoxysilane. Component (f)(i) may be present in the composition in an amount of from 0.1 to 5% by weight of the composition, alternatively 0.5 to 3% by weight, alternatively 0.5 to 2% by weight of the composition.

The second component of the adhesion promoter (f)(ii) is an organopolysiloxane oligomer containing at least one alkenyl and at least one hydroxy or alkoxy group in the molecule, for example an α, ω-hydroxy or alkoxy or both groups terminated polysiloxane containing pendant alkenyl groups in the molecule.

The oligomeric organopolysiloxane can for example be a methylvinylpolysiloxane in which both molecular terminals are dimethylhydroxysiloxy units, or a copolymer of a methylvinyl siloxane and dimethylsiloxane units in which both molecular terminals are dimethylhydroxysiloxy units. The oligomeric organopolysiloxane can be a mixture of organopolysiloxane molecules, some of which have silanol end groups at both molecular terminals and some of which have only one silanol group such as a dimethylhydroxysiloxy terminal unit with the other terminal unit being for example a dimethylmethoxysiloxy unit, a trimethylsiloxy unit or a dimethylvinylsiloxy unit. Preferably more than 50% by weight of the oligomeric organopolysiloxane, more preferably 60-100% comprises molecules having silanol end groups at both molecular terminals.

The oligomeric organopolysiloxane preferably contains at least 3%, more preferably at least 5%, by weight vinyl groups, and can contain up to 35 or 40% by weight vinyl groups. Most preferably the oligomeric organopolysiloxane contains 5 to 30% by weight vinyl groups. The oligomeric organopolysiloxane preferably has a molecular weight of 1000 to 10000. The oligomeric organopolysiloxane preferably has a viscosity of from 0.1 300 mPa·s, alternatively a viscosity of 0.1 to 200 mPa·s, and alternatively 1 to 100 mPa·s. (measured using a Brookfield DV 3T Rheometer at 25° C.). Component (f)(ii) may be present in the composition in an amount of from 0.1 to 5% by weight of the composition, alternatively 0.1 to 3% by weight, alternatively 0.1 to 2% by weight of the composition.

The third part of the adhesion promoter (f)(iii) is a suitable condensation catalyst which may be used to catalyse the reaction of the other components of the adhesion promoter, namely (f)(i) and (ii) and comprises a zirconate and/or aluminate condensation catalysts A further optional component of the hydrosilylation curable textile coating composition is a condensation catalyst which, when present, is used to activate and/or accelerate the reaction of the adhesion promoter (f) described above. The condensation catalyst may be selected from organometallic catalyst comprising zirconates, organoaluminium chelates, and/or zirconium chelates.

Zirconate based catalysts may comprise a compound according to the general formula or $Zr[OR^5]_4$ where each $R^5$ may be the same or different and represents a monovalent, primary, secondary or tertiary aliphatic hydrocarbon group which may be linear or branched containing from 1 to 20 carbon atoms, alternatively 1 to 10 carbon atoms. Optionally the zirconate may contain partially unsaturated groups. Preferred examples of $R^5$ include but are not restricted to methyl, ethyl, propyl, isopropyl, butyl, tertiary butyl and a branched secondary alkyl group such as 2,4-dimethyl-3-pentyl. Preferably, when each $R^5$ is the same, $R^5$ is an isopropyl, branched secondary alkyl group or a tertiary alkyl group, in particular, tertiary butyl. Specific examples include, zirconium tetrapropylate and zirconium tetrabutyrate, tetra-isopropyl zirconate, zirconium (IV) tetraacetyl acetonate, (sometimes referred to as zirconium $(AcAc)_4$, zirconium (IV) hexafluoroacetyl acetonate, zirconium (IV) trifluoroacetyl acetonate, tetrakis (ethyltrifluoroacetyl acetonate) zirconium, tetrakis (2,2,6,6-tetramethyl-heptanethionate) zirconium, zirconium (IV) dibutoxy bis(ethylacetonate), zirconium tributoxyacetylacetate, zirconium butoxyacetylacetonate bisethylacetoacetate, zirconium butoxyacetylacetonate bisethylacetoacetate, diisopropoxy bis (2,2,6,6-tetramethyl-heptanethionate) zirconium, or similar zirconium complexes having β-diketones (including alkyl-substituted and fluoro-substituted forms thereof) which are used as ligands.

Suitable aluminium based condensation catalysts may include but are not limited to one or more of $Al(OC_3H_7)_3$, $Al(OC_3H_7)_2(C_3COCH_2COC_{12}H_{25})$, $Al(OC_3H_7)_2(OCOCH_3)$, and $Al(OC_3H_7)_2(OCOC_{12}H_{25})$.

Component (f)(iii) may be present in the composition in an amount of from 0.1 to 5% by weight of the composition, alternatively 0.1 to 3% by weight, alternatively 0.1 to 2% by weight of the composition.

The adhesion promoter (f) is typically present in the composition in a cumulative amount of (f)(i), (ii) and (iii) of from about 0.3 to 6% wt. of the composition; alternatively, 0.3 to 4% wt. of the composition.

When the hydrosilylation curable textile coating composition as hereinbefore described is being cured via an addition/hydrosilylation reaction an inhibitor may be utilised to inhibit the cure of the composition. These inhibitors are utilised to prevent premature cure in storage and/or to obtain a longer working time or pot life of a hydrosilylation cured composition by retarding or suppressing the activity of the catalyst. Inhibitors of hydrosilylation catalysts (d), e.g., platinum metal-based catalysts are well known in the art and may include hydrazines, triazoles, phosphines, mercaptans, organic nitrogen compounds, acetylenic alcohols, silylated acetylenic alcohols, maleates, such as dibutyl maleate; fumarates, ethylenically or aromatically unsaturated amides, ethylenically unsaturated isocyanates, olefinic siloxanes, such as tetramethyltetravinylcyclotetrasiloxane; unsaturated hydrocarbon monoesters and diesters, conjugated ene-ynes, hydroperoxides, nitriles, and diaziridines. Alkenyl-substituted siloxanes as described in U.S. Pat. No. 3,989,667 may be used, of which cyclic methylvinylsiloxanes are preferred.

One class of known inhibitors of hydrosilylation catalysts, e.g., platinum catalysts (d) includes the acetylenic compounds disclosed in U.S. Pat. No. 3,445,420. Acetylenic alcohols such as 2-methyl-3-butyn-2-ol constitute a preferred class of inhibitors that will suppress the activity of a platinum-containing catalyst at 25° C. Compositions containing these inhibitors typically require heating at temperature of 70° C. or above to cure at a practical rate.

Examples of acetylenic alcohols and their derivatives include 1-ethynyl-1-cyclohexanol (ETCH), 2-methyl-3-butyn-2-ol, 3-butyn-1-ol, 3-methyl butynol 3-butyn-2-ol, propargyl alcohol, 2-phenyl-2-propyn-1-ol, 3,5-dimethyl-1-hexyn-3-ol, 1-ethynylcyclopentanol, 1-phenyl-2-propynol, 3-methyl-1-penten-4-yn-3-ol, and mixtures thereof. In one alternative the inhibitor is selected from one or more of 1-ethynyl-1-cyclohexanol (ETCH), tetramethyltetravinylcyclotetrasiloxane, 3-methyl butynol and/or dibutyl maleate.

When present, inhibitor concentrations as low as 1 mole of inhibitor per mole of the metal of catalyst (d) will in some instances impart satisfactory storage stability and cure rate. In other instances, inhibitor concentrations of up to 500 moles of inhibitor per mole of the metal of catalyst (d) are required. The optimum concentration for a given inhibitor in a given hydrosilylation curable textile coating composition herein is readily determined by routine experimentation. Mixtures of the above may also be used. Dependent on the concentration and form in which the inhibitor selected is provided/available commercially, when present in the composition, the inhibitor is typically present in an amount of from 0.0001-10% wt., alternatively 0.001-5%, inhibitor, alternatively 0.0125 to 5 wt. % of the composition.

Additional Optional Ingredients

Additional optional ingredients may be present in the liquid silicone rubber composition as hereinbefore described depending on the intended final use thereof. Examples of such optional ingredients include thermally conductive fillers, pot life extenders, flame retardants, lubricants, non-reinforcing fillers, pigments and/or colouring agents, bactericides, wetting agent, heat stabilizer, compression set additive, plasticizer, and mixtures thereof.

Pot life extenders, such as triazole, may be used, but are not considered necessary in the scope of the present invention. The liquid curable silicone rubber composition may thus be free of pot life extender.

Examples of flame retardants include aluminium trihydrate, chlorinated paraffins, hexabromocyclododecane, triphenyl phosphate, dimethyl methyl phosphonate, tris(2,3-dibromopropyl) phosphate (brominated tris), and mixtures or derivatives thereof.

Examples of lubricants include tetrafluoroethylene, resin powder, graphite, fluorinated graphite, talc, boron nitride, fluorine oil, silicone oil, molybdenum disulfide, and mixtures or derivatives thereof. When present in the composition, flame retardants are typically present in an amount of from 0.1 to 5% by weight of the composition. Non-reinforcing fillers may include such as crushed quartz, diatomaceous earths, barium sulphate, iron oxide, titanium dioxide and carbon black, talc, wollastonite. Other fillers which might be used alone or in addition to the above include aluminite, calcium sulphate (anhydrite), gypsum, calcium sulphate, magnesium carbonate, clays such as kaolin, aluminium trihydroxide, magnesium hydroxide e.g., brucite), graphite, copper carbonate, e.g., malachite, nickel carbonate, e.g., zarachite, barium carbonate, e.g., witherite and/or strontium carbonate e.g., strontianite.

Other fillers may include, aluminium oxide, silicates from the group consisting of olivine group; garnet group; aluminosilicates; ring silicates; chain silicates; and sheet silicates. The olivine group comprises silicate minerals, such as but not limited to, forsterite and $Mg_2SiO_4$. The garnet group comprises ground silicate minerals, such as but not limited to, pyrope; $Mg_3Al_2Si_3O_{12}$; grossular; and $Ca_2Al_2Si_3O_{12}$. Aluminosilicates comprise ground silicate minerals, such as but not limited to, sillimanite; $Al_2SiO_5$; mullite; $3Al_2O_3 \cdot 2SiO_2$; kyanite; and $Al_2SiO_5$. Ring silicates may be utilised as non-reinforcing fillers, these include silicate minerals, such as but not limited to, cordierite and $Al_3(Mg,Fe)_2[Si_4AlO_{18}]$. The chain silicates group comprises ground silicate minerals, such as but not limited to, wollastonite and $Ca[SiO_3]$. Sheet silicates may alternatively or additionally be used as non-reinforcing fillers where appropriate group comprises silicate minerals, such as but not limited to, mica; $K_2Al_{14}[Si_6Al_2O_{20}](OH)_4$; pyrophyllite; $Al_4[Si_8O_{20}](OH)_4$; talc; $Mg_6[Si_8O_{20}](OH)_4$; serpentine for example, asbestos; Kaolinite; $Al_4[Si_4O_{10}](OH)_8$; and vermiculite. In one alternative the fillers will be selected from one or more of fumed silica, precipitated silica, calcium carbonate, talc, mica, quartz and, aluminium oxide.

Further additives include silicone fluids, such as trimethylsilyl or OH terminated siloxanes. Such trimethylsiloxy or OH terminated polydimethylsiloxanes typically have a viscosity<150 mPa·s at 25° C. measured using a Brookfield DV 3T Rheometer. When present such silicone fluid may be present in the liquid curable silicone rubber composition in an amount ranging of from 0.1 to 5% by weight (% wt.), based on the total weight of the composition and may function as mold release agents.

Examples of pigments include titanium dioxide, chromium oxide, bismuth vanadium oxide, iron oxides and mixtures thereof.

Examples of colouring agents for textile coating include pigments, vat dyes, reactive dyes, acid dyes, chrome dyes, disperse dyes, cationic dyes and mixtures thereof.

In a preferred embodiment of the invention, the pigments and dyes are used in form of pigment masterbatch composed of them dispersed in the polydiorganosiloxane with a low viscosity (ingredient (a)) at the ratio of 25:75 to 70:30.

Examples of heat stabilizers include metal compounds such as red iron oxide, yellow iron oxide, ferric hydroxide, cerium oxide, cerium hydroxide, lanthanum oxide, copper phthalocyanine, aluminum hydroxide, fumed titanium dioxide, iron naphthenate, cerium naphthenate, cerium dimethylpolysilanolate and acetylacetone salts of a metal chosen from copper, zinc, aluminum, iron, cerium, zirconium, titanium and the like. The amount of heat stabilizer when present in a composition may range from 0.01 to 1.0% weight of the total composition.

In one embodiment there is provided a hydrosilylation curable textile coating composition comprising:
a) a linear organopolysiloxane polymer of polydiorganosiloxane polymer (a) having a viscosity of from 100 and 1000,000 mPa·s at 25° C., alternatively between 1000 and 150,000 mPa·s at 25° C., alternatively from 1000 mPa·s to 125,000 mPa·s, alternatively from 1000 mPa·s to 10,000 mPa·s at 25° C. having at least two alkenyl and/or alkynyl groups per molecule in an amount of from 10 to 90 wt. % of the of the composition; alternatively, from 40 to 80 wt. % of the of the composition, alternatively from 50 to 75 wt. of the composition;
b) reinforcing fillers comprising fumed silica, precipitated silica and/or calcium carbonate in an amount of from 1.0 to 50 wt. %. of the composition, alternatively of from 1 to 30 wt. %. of the solids content of the composition, alternatively of from 5.0 to 25 wt. %. based on the weight % of the solids content of the composition.
c) a linear trimethyl terminated polydimethyl methylhydrogen siloxane containing at least two, alternatively at least three silicon-hydrogen groups per molecule in an amount of from 1 to 30% wt of the composition, alternatively 1 to 20% wt. of the composition, alternatively 1 to 15 weight % of the composition;
d) a hydrosilylation cure catalyst in an amount of from 0.001 to 3.0 wt. % of the composition;
e) an organosilicon resin containing M and Q units and optionally $M^{vi}$ units, in an amount of from 1-60% wt., alternatively 1-40% wt.; of the composition;
f) an adhesion promoter comprising a mixture and/or reaction product of
   i) one or more alkoxysilanes having an epoxy group in the molecule in an amount of from 0.1 to 5% by weight of the composition, alternatively 0.5 to 3% by weight, alternatively 0.5 to 2% by weight of the composition;
   ii) a linear organopolysiloxane oligomer containing at least one alkenyl group and at least one hydroxy or alkoxy group per molecule in an amount of from 0.1 to 5% by weight of the composition, alternatively 0.1 to 3% by weight, alternatively 0.1 to 2% by weight of the composition; and
   iii) an organometallic condensation reaction catalyst comprising organoaluminum or organozirconium compounds composition in an amount of from 0.1 to 5% by weight of the composition, alternatively 0.1 to 3% by weight, alternatively 0.1 to 2% by weight of the composition;
which adhesion promoter (f) is typically present in the composition in a cumulative amount of (f)(i), (ii) and (iii) of from about 0.3 to 6% wt. of the composition; alternatively, 0.3 to 4% wt. of the composition. The composition may be any combination of the above ranges providing the total wt. % is 100 wt. %.

Typically prior to use the composition is stored in two parts, Part A and part B to keep ingredients (b) and (d) apart to avoid premature cure. Typically, a Part A composition will comprise components (a), (c) and (d) and Part B will comprise components (a), (b) and (c) and inhibitor when present. component (e) above may be present in either or both Part A and Part B. Regarding the adhesion promoter, to prevent premature reaction, component f) (iii) is usually stored in part A and components f (i) and (ii) are stored in part B.

Additives when present in the composition may be in either Part A or Part B providing they do not negatively affect the properties of any other ingredient (e.g., catalyst inactivation). Part A and part B of the hydrosilylation curable textile coating composition described herein are mixed together shortly prior to use to initiate cure of the full composition into a silicone elastomeric material. The compositions can be designed to be mixed in any suitable ratio e.g., part A:part B may be mixed together in ratios of from 10:1 to 1:10, alternatively from 5:1 to 1:5, alternatively from 2:1 to 1:2, but most preferred is a ratio of 1:1.

Ingredients in each of Part A and/or Part B may be mixed together individually or may be introduced into the composition in pre-prepared in combinations for, e.g., ease of mixing the final composition. For Example, components (a) and (b) are often mixed together to form an LSR polymer base or masterbatch prior to addition with other ingredients. These may then be mixed with the other ingredients of the Part being made directly or may be used to make pre-prepared concentrates commonly referred to in the industry as masterbatches.

In this instance, for ease of mixing ingredients, one or more masterbatches may be utilised to successfully mix the ingredients to form Part A and/or Part B compositions. For example, a "fumed silica" masterbatch may be prepared. This is effectively an LSR silicone rubber base with silica treated in situ. Any suitable additive may be incorporated into such a composition to form a concentrate/masterbatch to improve ease of introduction.

TABLE 1

Fumed Silica Masterbatch

| | Preferred |
|---|---|
| Fumed Silica having a surface area of from 50-450 m$^2$/g, alternatively, 50-400 m$^2$/g, alternatively from 50 to 300 m$^2$/g, alternatively 200-300 m$^2$/g (BET method in accordance with ISO 9277: 2010) | 20-30% |
| Dimethylvinyl terminated polydimethylsiloxane having a viscosity of from 1000 to 100,000 mPa · s at 25° C. | 60-70% |
| Hexamethyldisilazane | 2-10% |
| Tetramethyldivinyldisilazane | 0-1% |
| Dimethylhydroxy terminated vinylmethyl polysiloxane or a Dimethylhydroxy terminated vinylmethyl dimethyl polysiloxane having a viscosity of from 5 to 500 mPa · s and a vinyl content of 10 to 15% wt. | 0-1% |
| Water | 0.5-5% |

Hence, if a fumed silica masterbatch were utilised the Part A and part B compositions for a two part composition to be mixed in a 1:1 weight ratio might be depicted in the following Table 2.

TABLE 2

LSR part A&B formulation:

| | PART A | PART B |
|---|---|---|
| Fumed Silica Masterbatch from Table 1 above | 20-80% | 20-80% |
| Silicone Resin polymer (10 to 60% by weight of the mixture being silicone resin and 40 to 90% by weight being organopolysiloxane (a)) | 10-70% | 10-70% |
| dimethylvinyl-terminated polydimethylsiloxane having a viscosity of from 1000 to 100,000 mPa · s at 25° C. | 0-50% | 0-50% |
| Cross-linker | | 1.0-20.0% |
| Platinum catalyst solution | 0.01-3.0% | |
| Cure inhibitor (if present) | | 0.0001-5.0% |

The composition would also comprise 0.3 to 6% wt. of adhesion promoter with adhesion catalyst in Part A and the other components of the adhesion promoter in Part B. In each instance the total composition in Table 2 for part A and Part B compositions are 100% respectively.

Parts A and B of the composition may be prepared by combining all of their respective ingredients at ambient temperature. Any mixing techniques and devices described in the prior art can be used for this purpose. The particular device to be used will be determined by the viscosities of ingredients and the final composition. Suitable mixers include but are not limited to paddle type mixers e.g., planetary mixers and kneader type mixers. Cooling of ingredients during mixing may be desirable to avoid premature curing of the composition.

Prior to use the respective Part A and Part B compositions are mixed together in the desired ratio.

The present disclosure includes a process for coating a fabric with the coating composition as hereinbefore described. The fabric is preferably a woven fabric, particularly a plain weave fabric and polyester, but can for example be a knitted or nonwoven fabric. The fabric may be made from synthetic fibres or blends of natural and synthetic fibres, for example polyamide fibres such as nylon-6,6, polyester, polyimide, polyethylene, polypropylene, polyester-cotton, or glass fibres. For use as air bag fabric, the fabric should be sufficiently flexible to be able to be folded into relatively small volumes, but also sufficiently strong to withstand deployment at high speed, e.g., under the influence of an explosive charge. The coating compositions as hereinbefore described have good adhesion to plain weave nylon and polyester fabrics, which are generally difficult to adhere to. The coating compositions as hereinbefore described have particularly good adhesion and film forming properties immediately on contacting the fabric, so that film formation on the surface of the fabric being coated is uniform. The coating compositions of the invention also have good penetration into the fabric. Coated fabrics as hereinbefore described reduce gas permeability and/or good air tightness.

The coating composition as hereinbefore described may be applied on to the fabric substrate by any suitable known technique. These include spraying, gravure coating, bar coating, coating by knife-over-roller, coating by knife-over-air, padding, dipping and screen-printing. The coating composition can be applied to an air bag fabric which is to be cut into pieces and sewn to assemble an air bag, or to a one-piece woven air bag. The coating composition is generally applied at a coat-weight of at least 10 g/m$^2$, alternatively at least 15 g/m$^2$, and may be applied at up to 100 or 150 g/m$^2$, if required.

Although it is not preferred, it is possible to apply the composition in multiple layers, which together have the coat weights set out above. It is also possible to apply onto the coating composition a further compatible coating, e.g., of a material providing e.g., low friction, if deemed necessary.

When applied to an airbag or airbag fabric coatings formed by curing the composition hereinbefore described provide excellent scrub resistance for the coated fabrics and furthermore achieve significant adhesion. The resulting coatings have very good adhesion durability after heat humidity aging at 105° C. and 95% relative humidity for 408 hours. The adhesion promoter provides excellent bonding performance between compositions as hereinbefore described and airbags and/or airbag fabrics without negatively effecting the general properties of such coating compositions, e.g., with respect to cure, rheology, mechanical properties and processability of the hereinbefore described coating composition. The coated fabric shows low stiffness, good hand feeling, excellent scrub resistance and anti-blocking performance.

The provision by the composition herein of an improved scrub resistance reflects improved adhesion stability of the silicone coating to fabrics. Excellent scrub resistance is critical to prevent the silicone coating from delamination or falling off after a period of time. Improved scrub resistance ensures the silicone coating remains stable adhesion to fabrics and ensures long term a silicone based coating which ensures a coated airbag functions after a long period of time when a collision triggers deployment.

This technology can be used in any suitable airbag application, particularly in the automobile market but also for e.g., escape chutes from aircraft or alternatively as a textile binder coating composition. The fabric substrate onto which the composition as hereinbefore described is applied may be a woven fabric, particularly a plain weave fabric, but can for example be a knitted or nonwoven fabric. The fabric may be made from synthetic fibres or blends of natural and synthetic fibres, for example polyamide fibres such as nylon- 6,6, polyester, polyamine polyimide, polyethylene, polypropylene, polyester-cotton, or glass fibres. is preferably a woven fabric, particularly a plain weave fabric, but can for example be a knitted or nonwoven fabric. The preferred fabrics include polyamide and polyester for airbag/textile coating application.

EXAMPLES

In the following examples, percentages are given in weight unless otherwise stated and all viscosity measurements occur at 25° C. unless otherwise indicated. Unless otherwise indicated, the viscosity of the polymers was measured in accordance with ASTM D1084 using a Brookfield rotational viscometer with the most appropriate spindle for the viscosity being measured at 1 rpm, unless otherwise indicated. Cross-linker viscosities were measured using a glass capillary viscometer. Vinyl group and Si—H content was measured by Infrared spectroscopy in accordance with ASTM E168 using standards of the carbon double bond stretch and silicone hydrogen bond stretch respectively.

Preparation Process

As a first step an in-situ treated fumed silica masterbatch was prepared in a Kneader mixer by mixing the ingredients depicted in Table 1 and the stripping off residual water and treatment agents.

TABLE 3

In-situ treated fumed silica masterbatch ingredients

|  | Weight % |
|---|---|
| Fumed silica surface area of about 300 m$^2$/g (ISO 9277: 2010) | 28.15 |
| dimethylvinyl-terminated polydimethylsiloxane (1) having a viscosity of 65,000 mPa · s | 65.0 |
| Hexamethyldisilazane | 5.0 |
| Dimethylhydroxy terminated vinylmethyl dimethyl polysiloxane having a viscosity of about 30 mPa · s | 0.15 |
| Water | 1.7 |

The resulting fumed silica masterbatch was then utilized to make the two part liquid silicone rubber compositions depicted below in the following Tables in which Resin/Polymer 1 Mixture: is a mixture of an organosilicon resin and a dimethylvinyl terminated polydimethylsiloxane polymer. The organosilicon resin has number average molecular weight of about 21,000 g/mol (GPC), a molar ratio of M groups to Q groups of about 0.8:1 and a vinyl content of about 5% wt. The polymer has a vinyl content of 0.23% wt., and the mixture contains 34 wt % resin and has a viscosity of about 6000 mPa·s. Polymer 1: Dimethylvinyl terminated polydimethylsiloxane polymer having a vinyl content of 0.14% wt. and a viscosity of 12,000 mPa·s.

Cross-linker 1: Trimethyl terminated polydimethyl methylhydrogen siloxane, viscosity 5 mPa·s and 0.75% wt. Si—H content Cross-linker 2: Trimethyl terminated polydimethyl methylhydrogen siloxane, viscosity 50 mPa·s and 0.72% wt. Si—H content Part A containing Pt catalyst and Part B containing SiH crosslinker, were then mixed in a suitable ratio from 1:100 to 1:1. In the following the composition is designed to be mixed in a 1:1 weight ratio in a Turello mixer.

TABLE 3a

LSR Part A

| Formulation | Comp. 1 (wt %) | Comp. 2 (wt %) | Ex. 1 (wt %) | Ex. 2 (wt %) |
|---|---|---|---|---|
| Fumed Silica Masterbatch | 30 | 30 | 30 | 30 |
| Resin/Polymer 1 Mixture | 30 | 30 | 30 | 30 |
| Polymer 1 | 39.68 | 38.88 | 38.88 | 38.48 |
| Pt catalyst masterbatch having 5,000 ppm Pt | 0.32 | 0.32 | 0.32 | 0.32 |
| Tetraisopropoxy Titanate |  | 0.8 |  |  |
| 1:1 wt ratio zirconium tetrakisacetylacetonate/ Polymer 1 mixture |  |  | 0.8 | 1.2 |

TABLE 3b

LSR Part A

| Formulation | Ex. 3 (wt %) | Ex. 4 (wt %) | Ex. 5 (wt %) |
|---|---|---|---|
| Fumed Silica Masterbatch | 30 | 30 | 30 |
| Resin/Polymer 1 Mixture | 30 | 30 | 30 |
| Polymer 1 | 38.08 | 38.08 | 38.08 |
| Pt catalyst masterbatch containing 5,000 ppm Pt | 0.32 | 0.32 | 0.32 |
| 1:1 wt ratio zirconium tetrakisacetylacetonate/ Polymer 1 mixture | 1.6 | 1.6 | 1.6 |

TABLE 4a

LSR Part B

| | Comp. 1 (wt %) | Comp. 2 (wt %) | Ex. 1 (wt %) | Ex. 2 (wt %) |
|---|---|---|---|---|
| Fumed Silica Masterbatch | 30 | 30 | 30 | 30 |
| Resin/Polymer 1 Mixture | 30 | 30 | 30 | 30 |
| Polymer 1 | 30 | 24.76 | 24.76 | 24.76 |
| Cross-linker 1 | 9.0 | 11.5 | 11.5 | 11.5 |
| Ethynyl Cyclohexanol | 1.0 | 1.0 | 1.0 | 1.0 |
| Methacryloxypropyltrimethoxysilane |  | 0.96 | 0.96 | 0.96 |
| Glycidoxypropyltrimethoxysilane |  | 1.42 | 1.42 | 1.42 |
| Dimethylhydroxy terminated vinylmethyl dimethyl polysiloxane having a viscosity of about 30 mPa · s and a vinyl content of 12.5% wt. |  | 0.36 | 0.36 | 0.36 |

TABLE 4b

| LSR Part B | | | |
|---|---|---|---|
| | Ex. 3 (wt %) | Ex. 4 (wt %) | Ex. 5 (wt %) |
| Fumed Silica Masterbatch | 30 | 30 | 30 |
| Resin/Polymer 1 Mixture | 30 | 30 | 30 |
| Polymer 1 | 24.76 | 27.72 | 28.22 |
| Cross-linker 1 | 11.5 | 9.5 | |
| Cross-linker 2 | | | 9.0 |
| Ethynyl Cyclohexanol | 1.0 | 1.0 | 1.0 |
| Methacryloxypropyltrimethoxysilane | 0.96 | | |
| Glycidoxypropyltrimethoxysilane | 1.42 | 1.42 | 1.42 |
| Dimethylhydroxy terminated vinylmethyl dimethyl polysiloxane having a viscosity of about 30 mPa · s and a vinyl content of 12.5% wt. | 0.36 | 0.36 | 0.36 |

The Si—H to vinyl ratio for all comparatives and examples were in the region of 2.5 to 3:1.

The physical properties of the different examples and comparatives depicted in Tables 2 and 3 above were determined to ensure they were satisfactory. Samples were press cured to a thickness of 2 mm, at a temperature of 120° C. for 10 minutes. Other physical property testing followed ASTM standard (D2204 for Hardness, D412 for Tensile strength and Elongation at break, D4287 for viscosity, and D624 for tear strength).

TABLE 5

| Physical Properties | | | | | | | |
|---|---|---|---|---|---|---|---|
| Properties | Comp. 1 | Comp. 2 | Ex. 1 | Ex. 2 | Ex. 3 | Ex. 4 | Ex. 5 |
| Mixed viscosity 10/s (Pa · s, ASTM D4287) | 18 | 23 | 22 | 25 | 25 | 23 | 23 |
| Hardness (Shore A, ASTM D2204) | 34 | 36 | 34 | 36 | 35 | 33 | 32 |
| Tensile strength (MPa, ASTM D412) | 4.6 | 4.7 | 4.9 | 4.3 | 4.5 | 4.7 | 4.2 |
| Elongation at break (%, ASTM D412) | 291 | 258 | 239 | 268 | 256 | 326 | 312 |
| Tear Strength (Die C, KN/m, ASTM D624) | 15.8 | 16.8 | 16.6 | 15.9 | 17.3 | 17.2 | 16.9 |

Samples of coated fabrics, coated with the example and comparative examples depicted above were prepared using a Mathis lab coater. The Part A and Part B compositions were mixed in a 1:1 weight ratio in a speed mixer with. Then the resulting mixture was coated on PA66 (Nylon 66 woven fabric) and PET (polyethylene terephthalate woven fabric) respectively in the Mathis lab coater by knife coating. The coated fabrics were then heated at 190° C. for 1 min. to cure the coating on the fabric and then subsequent to cooling the coat weight was determined and was found to be approximately 35±5 g/m² for each sample.

Samples of the coated fabrics were also analysed for scrub (abrasion) resistance before and after heat/humidity aging at 105° C. and 95% relative humidity for 408 hrs according to EASC 99040180 A09 and the results are shown in Tables 6a and 6b below.

TABLE 6a

| Scrub Resistance (Strokes, EASC 99040180 A09) | | | | | | | |
|---|---|---|---|---|---|---|---|
| | Comp. 1 | Comp. 2 | Ex. 1 | Ex. 2 | Ex. 3 | Ex. 4 | Ex. 5 |
| LSR coated PA66 | 100 | 1000 | 1500 | 1600 | 1600 | 2000 | 2000 |
| LSR coated PET | 100 | 600 | 1500 | 1600 | 1600 | 2000 | 2000 |

TABLE 6b

| Scrub Resistance after heat humidity (HH) aging at 105° C., 95% RH/408 h (Strokes, EASC 99040180 A09) | | | | | | | |
|---|---|---|---|---|---|---|---|
| | Comp. 1 | Comp. 2 | Ex. 1 | Ex. 2 | Ex. 3 | Ex. 4 | Ex. 5 |
| LSR coated PA66 | 20 | 200 | 400 | 800 | 1000 | 1600 | 1600 |
| LSR coated PET | 20 | 100 | 400 | 600 | 600 | 1600 | 1600 |

Whilst comparative 2 containing a tetraisopropoxy Titanate (TIPT) based adhesion package improved the scrub resistance of coated fabric when compared to comparative 2 it is to be noted that the scrub resistance after heat humidity aging was poor. The examples of the present disclosure CV-ZC are much better than the composition of comparative 2 for scrub improvement. Excellent scrub resistance was achieved using compositions of the examples herein and these results were still good after aging as can be seen in Table 6b above, (>600 strokes after HH aging).

The invention claimed is:
1. A hydrosilylation curable textile coating composition, the composition comprising:
 (a) a linear organopolysiloxane polymer having at least two alkenyl and/or alkynyl groups per molecule;
 (b) a reinforcing filler comprising at least one of fumed silica, precipitated silica, or calcium carbonate;
 (c) a linear trimethyl terminated polydimethyl methylhydrogen siloxane containing at least two, optionally at least three, silicon-bonded hydrogen groups per molecule;
 (d) a hydrosilylation cure catalyst;
 (e) an organosilicon resin containing M and Q units, wherein M units are $R^2_3SiO_{1/2}$ and Q units are $SiO_{4/2}$, each $R^2$ is the same or different monovalent hydrocarbon group, and at least one $R^2$ is a vinyl group; and
 (f) an adhesion promoter comprising a mixture and/or reaction product of:
  (i) one or more alkoxysilanes having an epoxy group in the molecule;
  (ii) a linear organopolysiloxane oligomer containing at least one alkenyl group and at least one hydroxy or alkoxy group per molecule; and
  (iii) an organometallic condensation reaction catalyst comprising organoaluminum or organozirconium compounds;
 wherein component (e) contains an average of from 2 to 7.5 weight % vinyl groups;
 wherein the molar ratio of M to Q units has a value of from 0.6:1 to 1.1:1;
 wherein component (e) has a number-average molecular weight of from 3,000 to 30,000 g/mol;
 wherein:
  component (a) is present in an amount of from 50 to 75 wt. % of the composition;
  component (b) is present in an amount of from 5 to 25 wt. % of the composition;
  component (c) is present in an amount of from 1 to 30 wt. % of the composition;
  component (d) is present in an amount of from 0.001 to 3 wt. % of the composition;
  component (e) is present in an amount of from 1 to 40 wt. % of the composition; and
  component (f) is present in an amount of from 0.3 to 6 wt. % of the composition;
   provided the total wt. % is 100 wt. % of the composition; and
  wherein the composition, upon cure on a fabric substrate, has a scrub resistance of greater than 600 strokes after heat aging at 105° C. and 95% relative humidity in accordance with EASC 99040180 A09.
2. The composition in accordance with claim 1, wherein
 i) the molar ratio of silicon-bonded hydrogen groups to alkenyl groups and alkynyl groups in the composition is from 1:1 to 5:1 in accordance with ASTM E168, and/or
 ii) component (c) is present in an amount of from 1 to 15% by weight of the composition.
3. The composition in accordance with claim 1, wherein the adhesion promoter (f) is present in the composition in a cumulative amount of components (f) (i), (ii) and (iii) of from about 0.3 to 4% by weight of the composition.
4. The composition in accordance with claim 1, wherein component (f) (i) is
 i) selected from the group consisting of 3-glycidoxypropyl trimethoxysilane, 3-glycidoxypropyl triethoxysilane, 3-glycidoxypropyl methyldimethoxysilane, 4-glycidoxybutyl trimethoxysilane, 5,6-epoxyhexyl triethoxysilane, 2-(3,4-epoxycyclohexyl) ethyltrimethoxysilane, and 2-(3,4-epoxycyclohexyl) ethyltriethoxysilane, and/or
 ii) is present in an amount of from 0.1 to 5% by weight of the composition.
5. The composition in accordance with claim 1, wherein component (f) (ii) is
 i) a methylvinylpolysiloxane in which both molecular terminals are dimethylhydroxysiloxy units, or a copolymer of a methylvinyl siloxane and dimethylsiloxane units in which both molecular terminals are dimethylhydroxysiloxy units, in each case having a viscosity not exceeding 500 mPa·s at 25° C., and/or
 ii) is present in an amount of from 0.1 to 5% by weight of the composition.
6. The composition in accordance with claim 1, wherein component (f) (iii) is a zirconate based catalyst selected from the group consisting of zirconium tetrapropylate, zirconium tetrabutyrate, tetra-isopropyl zirconate, zirconium (IV) tetraacetyl acetonate, zirconium (IV) hexafluoracetyl acetonate, zirconium (IV) trifluoroacetyl acetonate, tetrakis (ethyltrifluoroacetyl acetonate) zirconium, tetrakis (2,2,6,6-tetramethyl-heptanethionate) zirconium, zirconium (IV) dibutoxy bis(ethylacetonate), zirconium tributoxyacetylacetate, zirconium butoxyacetylacetonate bisethylacetoacetate, zirconium butoxyacetylacetonate bisethylacetoacetate, diisopropoxy bis(2,2,6,6-tetramethyl-heptanethionate) zirconium, and zirconium complexes having β-diketones.
7. The composition in accordance with claim 1, wherein the composition further comprises an inhibitor to inhibit cure of the composition.
8. The composition in accordance with claim 1, wherein the composition is stored in two parts, Part A and Part B, in which Part A comprises components (a), (b), (d), and (f) (iii) and optionally component (e), and Part B comprises components (a), (b), (c), (f)(i), and (f)(ii) and optionally component (e).
9. The composition in accordance with claim 1, which upon cure on a fabric substrate has a scrub resistance of 800 strokes or greater after heat aging at 105° C. and 95% relative humidity in accordance with EASC 99040180 A09.
10. An airbag fabric coated with an elastomeric coating which is a cured product of the hydrosilylation curable textile coating composition in accordance with claim 1.
11. The airbag fabric in accordance with claim 10, which has a scrub resistance of 800 strokes or greater after heat aging at 105° C. and 95% relative humidity in accordance with EASC 99040180 A09.
12. A method of coating a textile with the hydrosilylation curable textile coating composition in accordance with claim 1, comprising mixing the composition, coating a textile with the composition, and curing the composition on the textile.
13. A method of coating a textile with the hydrosilylation curable textile coating composition in accordance with claim 1, wherein the textile is coated with the composition by spraying, gravure coating, bar coating, coating by knife-over-roller, coating by knife-over-air, padding, dipping and screen-printing, and/or wherein the composition is applied at a coat-weight of from 10 g/m² to 150 g/m².

* * * * *